Jan. 5, 1960    N. GEERTSEN    2,919,788
SEAM INDEXING DEVICES FOR CAN BODIES
Filed March 16, 1956    4 Sheets-Sheet 1

INVENTOR.
NELSON GEERTSEN
BY Charles H. Erne
Leland R. McCann
George W. Reifer
ATTORNEYS Jan. 5, 1960 N. GEERTSEN 2,919,788
SEAM INDEXING DEVICES FOR CAN BODIES
Filed March 16, 1956 4 Sheets-Sheet 2
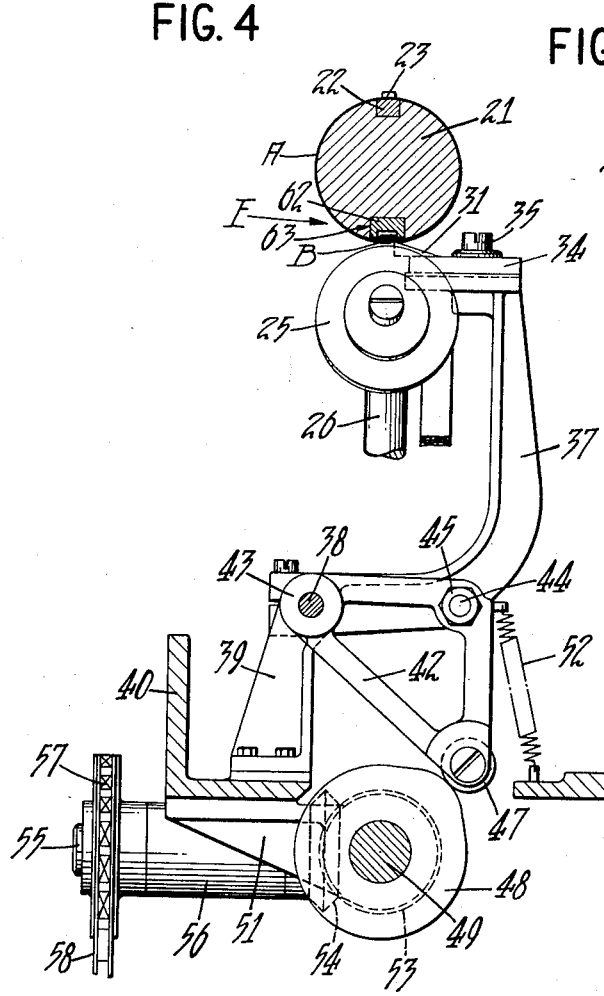
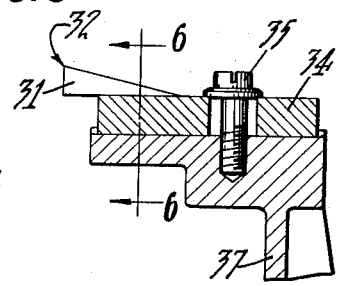
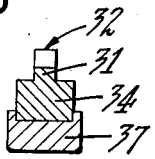
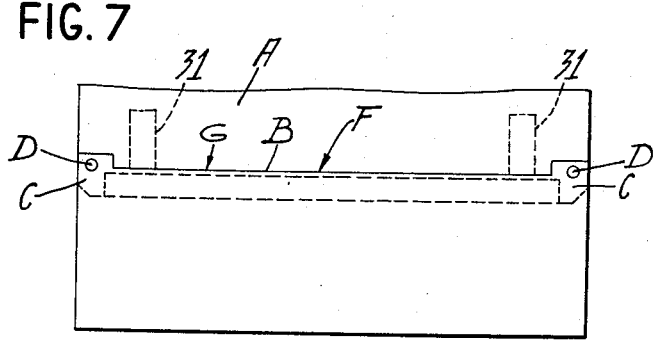
INVENTOR.
NELSON GEERTSEN
BY
ATTORNEYS

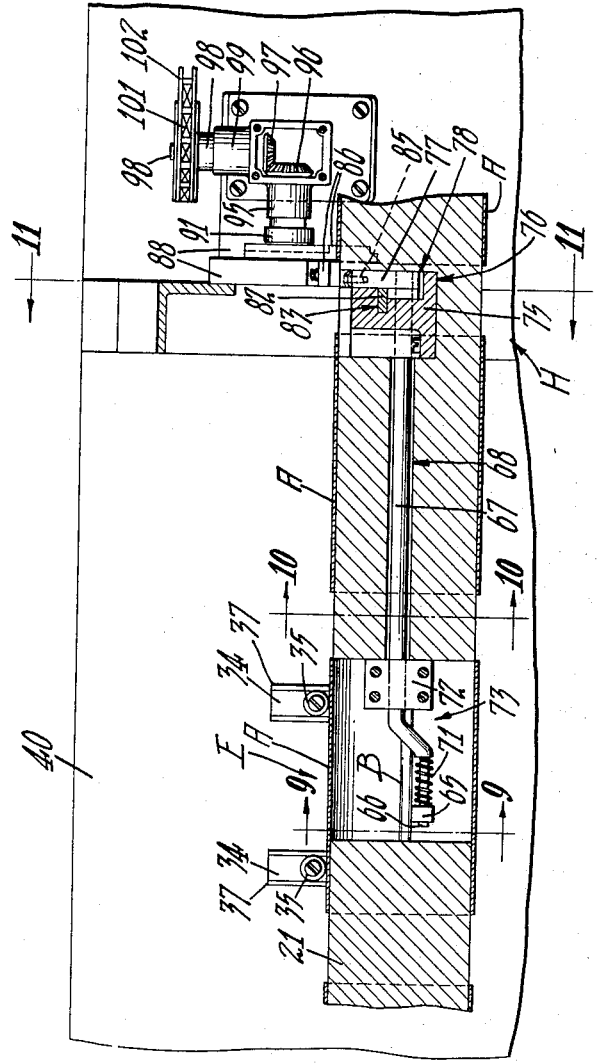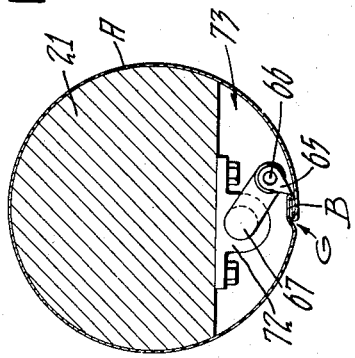
INVENTOR.
NELSON GEERTSEN

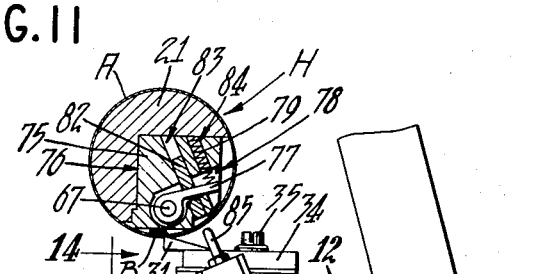
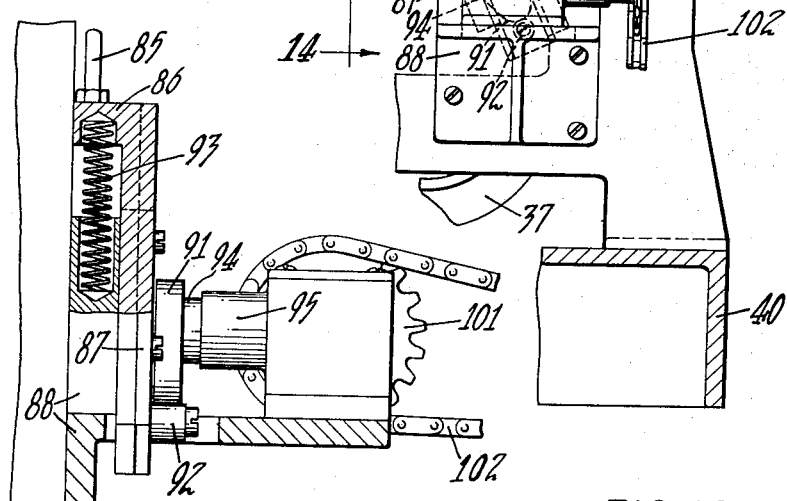
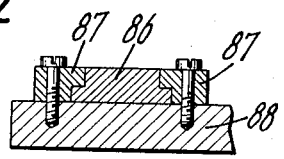
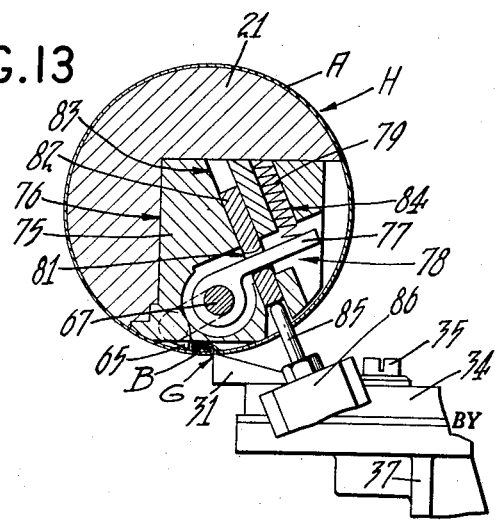

2,919,788
SEAM INDEXING DEVICES FOR CAN BODIES

Nelson Geertsen, Oak Park, Ill., assignor to American Can Company, New York, N.Y., a corporation of New Jersey Application March 16, 1956, Serial No. 572,123

6 Claims. (Cl. 198—33)

The present invention relates to machines for making can bodies and has particular reference to devices for indexing the side seams of the bodies for a treatment thereon.

In the manufacture of cylindrical sheet metal can bodies, a flat rectangular blank usually is formed into a tubular shape, and its adjacent opposed marginal edge portions are overlapped or interlocked as the case may require, to produce the well known lapped or lap and lock side seam to hold the resulting can body together. The opposite ends of the seam usually are of the lap construction and these often are spot welded to hold the laps together. Usually the seam is soldered along its length after formation. These operations usually are performed on a can body making machine which includes a bodymaker and a soldering apparatus.

In the bodymaker, the partially formed can body is advanced step-by-step along a mandrel or horn which supports the body during the side seam forming operations. Welding of the end laps usually is effected after the seam is closed. In traveling along the horn from the seam closing station to the welding station, it has been found that the body has a tendency to rotate slightly on its axis so that the laps in the seam are out of register laterally with the welding devices when the body arrives at the welding station.

It is an object of the instant invention to provide an indexing device for a can bodymaker, which functions to rotate out-of-register side seams into register with the welding elements so that the laps in the seams will be located in a predetermined position for proper welding together of these lap portions.

Another object is the provision of such an indexing device which is applicable for use inside the can bodies as well as outside or for a combination of both, so as to provide for accurate location of the seam at a desired station.

Another object is the provision of such a device which is effective while the can bodies are advancing along their path of travel so as to eliminate static friction against the horn or other support during the indexing operation.

Another object is the provision of such a device which makes possible the elimination of outside guide rails often used to guide the side seam and thereby eliminates scratching of the can bodies.

Numerous other objects and advantages of the invention will be apparent as it is better understood from the following description, which, taken in connection with the accompanying drawings, discloses a preferred embodiment thereof.

Referring to the drawings:

Fig. 4 is a sectional view taken substantially along the broken line 4—4 in Fig. 1, with parts broken away;

Fig. 5 is an enlarged sectional detail as viewed substantially along the line 5—5 in Fig. 1;

Fig. 6 is a sectional view taken substantially along the line 6—6 in Fig. 5;

Fig. 7 is an enlarged plan view of the side seam portion of a can body, showing the end lap portions to be welded;

Fig. 8 is a horizontal section through the can body support of a can bodymaker equipped with devices for aligning the can body side seams from inside the body; parts being broken away;

Figures 1, 2, 3:
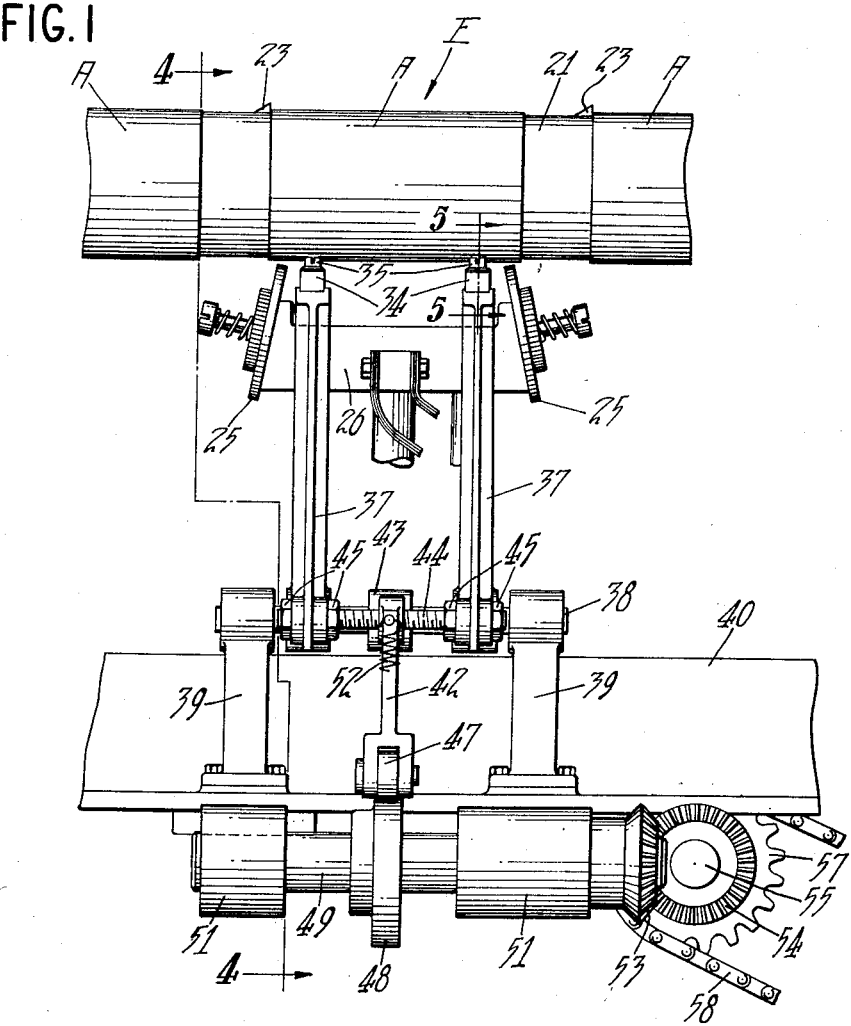
Figure 1 is a side elevation of principal parts of a can bodymaker embodying the instant invention, with parts broken away.
Figs. 2 and 3 are enlarged sectional details of the side seam portion of a can body and fragmentary portions of elements for aligning out-of-register side seams from the outside of the can body.

Figs. 9 and 10 are enlarged sectional views taken substantially along the respective lines 9—9 and 10—10 in Fig. 8;

Fig. 11 is a sectional view taken substantially along the line 11—11 in Fig. 8, with parts broken away;

Fig. 12 is an enlarged sectional view taken substantially along the line 12—12 in Fig. 11;

Fig. 13 is an enlarged sectional view of certain of the parts illustrated in the upper portion of Fig. 11; and Fig. 14 is an enlarged side elevation as viewed along a plane indicated by the line 14—14 in Fig. 11, portions being broken away and shown in section.

As a preferred or exemplary embodiment of the instant invention, the drawings illustrate principal parts of a can body making machine of the character disclosed in United States Patent 1,773,892 issued August 26, 1930 to J. A. Toleik on Electric Welding. In such a machine a flat rectangular sheet metal blank is wrapped around a cylindrical supporting horn or mandrel 21 (Figs. 1 and 4) and is advanced endwise therealong in step-by-step fashion, by stroke bars 22 having feed dogs 23. The dogs 23 advance the partially formed can body through a plurality of stations at which the side seam marginal edge portions of the body are shaped and interlocked to produce a cylindrical can body A having a lap and lock side seam B (see also Figs. 2, 3 and 7) extending the length of the body.

The ends of the side seam B are lapped as indicated at C (Fig. 7) and the laps are secured together by weld spots D. The welding preferably is performed by vertically movable roller electrodes 25 located at a welding station E and carried on a movable head 26 as disclosed in the above mentioned Toleik Patent 1,773,892. Between the lap portions C, the seam edge portions of the body are formed with reversely bent hooks which are interlocked by a bumping operation which is usual in can bodymakers, to produce a lock portion F of the seam. The seam B usually is disposed on the inside of the can body as shown in Figs. 2 and 3 and this formation provides on the outside of the body a longitudinal recess G along the lock section which is utilized together with the seam inside the body, to align or locate the seam laterally in register with the welding electrodes 25 as the body advances into the welding station E.

Alignment of the side seam B from outside the body preferably is effected by a pair of reciprocable aligning fingers 31 (Fig. 5) having a free and exposed sharp edge 32 for engagement as shown in Figs. 2 and 3, in the recess G in the outer surface of the body at two widely spaced places along the lock section of the seam. In the usual bodymaker the side seam B of a can body A is disposed under or adjacent the bottom of the horn 21. Hence the aligning fingers 31 are located under the horn. The fingers 31 are movable in unison transversely of the horn through an aligning stroke, toward the left as viewed in Figs. 2 and 4 and thence through a return stroke in time with the advancement of the can body into the welding station.

For the above purpose, the aligning fingers 31 preferably are formed as parts of a pair of adjustable blocks 34 (Figs. 1, 4, 5 and 6) fastened by screws 35 to the upper ends of a pair of spaced and parallel upright arms 37 carried on a rocker shaft 38 journaled in a pair of bearing blocks 39 secured to a frame 40 which may be a part of the main frame of the bodymaker. The arms 37 are rocked, to effect reciprocation of the aligning fingers 31, through a triangular shaped rocker 42 which is formed with a bearing 43 surrounding the rocker shaft 38 and which rocker carries a threaded shaft 44 which projects from opposite sides of the rocker and extends through both of the upright arms 37. Locknuts 45 on opposite sides of the arms 37 provide for adjustment of the arms and the aligning fingers 31 along the side seam B of the can body and to lock the arms in place after such an adjustment.

The rocker 42 also carries a cam roller 47 which operates against an edge cam 48 mounted on a rotatable cam shaft 49 journaled in a pair of spaced bearing blocks 51 on the main frame 40. A tension spring 52 stretched between the rocker 42 and the frame 40 keeps the roller 47 engaged against the cam 48. The cam shaft 49 is rotated in time with the other moving parts of the bodymaker, by a bevel gear 53 which is carried on one end of the cam shaft. The bevel gear 53 meshes with and is driven by a bevel gear 54 mounted on a short shaft 55 journaled in a bearing 56 on the main frame 40. The short shaft 55 is driven continuously by a sprocket 57 which is carried thereon and which is actuated by an endless chain 58 driven from the main shaft of the bodymaker.

Through the continuous rotation of the short shaft 55, the edge cam 48 actuates the rocker 42, the upright arms 37 and the aligning fingers 31 through one cycle of operation for each can body A as it enters the welding station E. The can body A while moving into this welding station has a natural tendency to rotate in a counterclockwise direction on the horn 21 (as viewed in Fig. 4) and thereby shifts the position of its side seam B toward the right as viewed in Fig. 4, i.e. in a direction toward the aligning fingers 31 in the retracted position of the latter as shown in Figs. 2 and 4.

During the cycle of operation, the fingers 31 move toward the incoming can body A and engage in the seam recess G as shown in Fig. 2 and rotate the body in a clockwise direction while it is moving so as to eliminate static friction. This rotation of the can body continues until the seam B on the inside of the body, engages against and is stopped as shown in Figs. 3 and 4, by a shoulder 61 of a grooved spline bar 62 mounted in a longitudinal groove 63 in the bottom of the horn 21. The aligning fingers 31 temporarily hold the seam in this position until the can body stops advancing and then moves back toward the right in Fig. 4, through their return stroke. In this manner the seam is properly located for the spot welding at D of the lap portions C of the seam.

Provision is also made for aligning the seam B from inside the can body A, and this may be effected in conjunction with the outside aligning fingers 31 or may be effected separately and independently of the outside fingers if desired. If used in conjunction with the outside fingers 31 the stop shoulder 61 in the spline 62 may be eliminated.

Aligning of the seam B from inside the can body preferably is effected by an auxiliary or inside aligning finger 65 (Figs. 8, 9 and 13) which is freely oscillatable on an offset shaft 66 of a crank shaft 67 extending through a clearance groove 68 (see also Fig. 10) in the bottom of the horn 21. The inside finger 65 is connected to one end of a torsion spring 71 (Fig. 8) which is wrapped around the offset shaft 66 and which urges the finger 65 in the direction of the seam B on the inside of the body A. The finger 65, the offset shaft 66 and a bearing 72 for the crank shaft 67 are located in a clearance recess 73 in the bottom of the horn 21 at a location adjacent the welding station E.

Beyond the welding station E, at a location H (Fig. 8) between adjacent can bodies A at rest on the horn 21, the crank shaft 67 is mounted for oscillation in a bearing cage 75 secured in a recess 76 in the horn 21. In the cage 75, the crank shaft 67 carries an actuating arm 77 (Fig. 13) disposed in a clearance space 78 in the cage. The arm 77 loosely extends through and is confined in an opening 81 of an angularly substantially radially disposed slide plate 82 carried in a slideway 83 in the cage 75. A compression spring 79 disposed in a bore 84 in the cage 75 bears against the upper face of the actuating arm 77 and urges the arm in a downward direction as viewed in Fig. 13.

The arm 77 is pushed up to actuate the inside finger 65 to engage against the seam B on the inside of the can body and thereby rotates the body clockwise on the horn 21 (Fig. 9) to shift the seam into proper lateral alignment. This is effected from outside the body just prior to the body coming to rest at the welding station. For this purpose a push pin 85 (Figs. 11, 13 and 14) is disposed outside the horn 21 and in an angular position in endwise alignment with the lower edge of the slide plate 82. The pin 85 is secured in the upper end of an angularly disposed pusher bar 86 mounted between a pair of slide gibs 87 (see also Fig. 12) on a bracket 88 attached to the frame 40.

The pusher bar 86 is reciprocated toward and away from the horn 21 in time with the other moving parts of the apparatus and in time with the advancement of the can bodies along the horn 21, by an edge cam 91 (Figs. 11 and 14) which operates against a cam roller 92 carried on the pusher bar. An expansion or compression spring 93 interposed between the pusher bar 86 and the bracket 88 keeps the cam roller 92 in engagement with the edge cam 91.

The cam 91 is mounted for rotation on a cam shaft 94 which is journaled in a bearing 95 in the bracket 88. The shaft 94 is rotated continuously through a bevel gear 96 (Fig. 8) which is carried on one end of the shaft and which meshes with a bevel gear 97 mounted on a sprocket shaft 98 journaled in a bearing 99 in the bracket 88. This sprocket shaft 98 is rotated by a sprocket 101 which is actuated by an endless chain 102 which is driven from the can bodymaker.

In order to permit the free advancement of the can bodies A along the horn 21, the push pin 85 normally is disposed in a retracted position as shown in Fig. 11. As a body moves into the welding station E, the pusher bar 86 moves toward the horn 21 and advances the push pin 85 into the space H between two adjacent can bodies on the horn and projects the pin into the lower end of the slideway 83 (Fig. 13) so as to push upwardly against the slide 82. This rocks the crank shaft 67 in a counterclockwise direction (as viewed in Fig. 13) and thus pushes the inside finger 65 against the side seam B to rotate the can body on the horn and thus align the seam with the welding electrodes.

When the inside finger 65 is used in conjunction with the outside fingers 31 it operates in opposition to these outside fingers and thus confines the side seam B between them to locate the seam in proper position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making can bodies having side seams, the combination of means for advancing a tubular can body having a longitudinal side seam in an endwise direction along an elongated support, a side seam aligning finger disposed laterally of the path of travel of the side seam of said advancing can body and movable transversely of the path of travel of said side seam, and means for moving said finger transversely into engagement with said side seam for rotating said can body on its longitudinal axis to shift said seam laterally into a predetermined position on said support for a subsequent operation thereon.

2. The combination defined in claim 1, and stop means disposed adjacent the path of travel of said side seam for limiting the lateral travel thereof to locate said seam in its predetermined position.

3. The combination defined in claim 1, and means for moving said finger in time with and simultaneously with the advancement of said can body to rotate said body during its advancement.

4. The combination defined in claim 1, wherein said finger is mounted for transverse movement outside of said can body and is engageable with the exterior groove of said side seam in said can body.

5. The combination defined in claim 1, wherein said finger is mounted for transverse movement inside said can body and is engageable with the inner lateral surface of said side seam.

6. The combination defined in claim 5, and means operable outside of said can body for actuating said finger inside the body.

References Cited in the file of this patent

UNITED STATES PATENTS

| | | |
|---|---|---|
| 389,828 | Adriance | Sept. 18, 1888 |
| 488,476 | Hume | Dec. 20, 1892 |
| 1,808,261 | Sessions | June 2, 1931 |
| 2,563,805 | Adamson | Aug. 14, 1951 |